United States Patent Office 3,455,368
Patented July 15, 1969

3,455,368
PROCESS FOR THE PRODUCTION OF
REFRACTORY SHELL MOLDS
Eric James Shepherd, Pinner, England, assignor to Monsanto Chemicals Limited, London, England, a British company
No Drawing. Continuation-in-part of application Ser. No. 372,119, June 2, 1964. This application Oct. 26, 1966, Ser. No. 589,483
Claims priority, application Great Britain, June 14, 1963, 23,715/63
Int. Cl. B22c 9/12
U.S. Cl. 164—16          9 Claims

ABSTRACT OF THE DISCLOSURE

Processes for the production of a refractory shell mould in which there is applied to a fusible pattern a coating of an aqueous slurry having an acid pH value and containing a finely-divided refractory filler and a silica-containing binding agent, the binding agent having a silica content expressed as $SiO_2$ of between 7 and 50% by weight, the coated pattern is placed in a chamber, gaseous ammonia is injected into the chamber to give an atmosphere containing 0.05% to 5% of ammonia by volume, the coated pattern is retained in this atmosphere for a time between 10 seconds and five minutes sufficient to gel the coating, the ammonia atmosphere is exhausted from the chamber, and the coated pattern is removed. The above steps are repeated in order to prepare a refractory shell mould which contains a series of layers, such mould being characterized by having a flexural strength which is substantially greater than those moulds produced by using the prior art processes.

---

The subject matter of the present invention was disclosed, in part, in my copending application for Letters Patent, Ser. No. 372,119, filed in the U.S. Patent Office on June 2, 1964. The present application should be considered in conjunction with said application Ser. No. 372,119, now abandoned, and considered as a continuation-in-part thereof.

This invention relates to the production of refractory shell moulds using silica-containing binding agents.

Various ways of preparing refractory moulds have been proposed, and one which is effective and economical in its use of starting-materials is the so-called shell moulding process. In this process a shell is formed around a fusible pattern by coating it with a slurry of a powdered refractory and a binding agent, causing the slurry to gel, and removing the pattern by melting or burning it out. To build up a shell of sufficient thickness to act as a mould in metal casting it is generally found necessary to apply several coats of the slurry, so that the final shell has a laminated structure. Each coat must of course be allowed sufficient time to gel before the application of the next, and the time taken to form the finished shell therefore depends to some extent on the speed and uniformity with which the coating of slurry can be gelled.

Although attempts have been made to speed up the gelling of the coating of slurry, these attempts have been somewhat unsatisfactory in that when the ungelled coating is treated with an accelerating agent in air the gelling of the coating tends to be non-uniform, that is, certain portions of the coatings gel rapidly due to the accelerating agent while other portions of the coating do not gel as rapidly and sometimes tend to remain ungelled or only partially gelled.

A specific process for producing a refractory shell mould has now been developed in which a silica-containing binding agent is employed and in which a coating containing this is gelled quickly and uniformly in a controlled manner and the resultant shell mould has a substantially increased flexural strength as contrasted to the flexural strength of the mould produced by the prior art processes.

The process of the invention is one for the production of a refractory shell mould, in which there is applied to a fusible pattern a coating of an aqeous slurry having an acid pH value and containing a finely-divided refractory filler and a silica-containing binding agent, the binding agent having a silica content expressed as $SiO_2$ of between 7 and 50% by weight, the coated pattern is placed in a chamber, gaseous ammonia is injected into the chamber to give an atmosphere containing from 0.05% to 5% of ammonia by volume, preferably less than 5% by volume, the coated pattern is retained in this atmosphere for a time between 10 seconds and 5 minutes sufficient to gel the coating, the ammonia atmosphere is exhausted from the chamber, and the coated pattern is removed.

The present invention provides a means for controllably and uniformly gelling the coatings which comprise the steps of (1) placing said coated pattern containing a coating in an ungelled state in a chamber, (2) introducing gaseous ammonia into said chamber in an amount sufficient to provide an atmosphere containing from about 0.05 to about 5% by volume of said gaseous ammonia, (3) contacting the coated pattern with the atmosphere of ammonia in the chamber for a period of from about 10 seconds to about 10 minutes thereby controllably and uniformly gelling the coating and (4) removing the atmosphere of ammonia and the coated pattern containing the gelled coating from the chamber.

Usually, the binding agent has a silica content of between 7 and 35% by weight.

The binding agent is preferably a solution of a hydrolysed organic silicate such as ethyl silicate, or a silica sol (that is to say a colloidal solution of silica). The silica content of the binding agent is very often between 10 and 30% by weight of the binding agent, for instance about 25% by weight.

Where the binding agent is one formed by hydrolysis of an organic silicate this can be orthosilicate but in practice is usually a condensed silicate, that is to say a mixture of polysilicates. Good results are obtained using an ethyl silicate or an isopropyl silicate for example a mixture of silicates prepared by the reaction of silicon tetrachloride with ethyl or isopropyl alcohol containing a small proportion of water. The commercial ethyl silicate sold under the name "Silester OS" ("Silester" is a registered trade mark) is particularly useful. In use the silicate is hydrolysed with up to 15% by weight of water in the presence of an acid, for instance hydrochloric acid, and a mutual solvent, for instance ethyl or isopropyl alcohol; the binding agent accordingly has an acid pH.

The binding agent can also be a silica sol, which can suitably be one containing perhaps 15% to 50% of silica by weight. Good results are obtained when the concentration of silica in the sol is within the range of from 20% to 40% by weight, particularly when the concentration is about 30% by weight. The aqueous silica sols containing about 30% by weight of silica which are commerically available under the names "Syton 2X" and "Syton P" ("Syton" is a registered trade mark) are especially useful. Preferably the silica sol is acidified so that the binding agent has an acid pH.

A typical aqueous silica sol has an $SiO_2:M_2O$ weight ratio (where M is a metal, for instance sodium or potassium) between 40:1 and 500:1, for instance between 60:1 and 300:1; preferably the range is between 80:1 and 150:1 for instance about 100:1. The more useful aqueous silica sols (that is the sols employed prior to acidification) are those which in addition to having the characteristics referred to above, contain less than 1.5% by weight of inorganic salts, for example, $MCl$ or $M_2SO_4$ (where M is an alkali metal) or other salts, preferably less than 1% by weight of said salts or more desirably less than 0.3% by weight of such salts, also the more useful aqueous silica sols contain silica particles having a particle size in the range of from about 5 to about 250 millimicrons and preferably in the range of from about 10 to about 100 millimicrons. These particles being preferably spherical or substantially spherical although some particles may be joined together as doublets or triplets. It is sometimes preferable, particularly where a wax pattern is employed, to have a wetting agent present in the slurry. The wetting agent can be one of the conventional nonionic or anionic materials. A nonionic agent such as a condensation product of ethylene oxide and an alcohol or phenol gives results. It may be desirable in addition for an anti-foaming agent, for example a higher alcohol, to be present.

The standard refractory fillers can be employed in preparing a slurry with the binding agent. Suitable fillers are for instance refractory oxides and silicates, such as alumina, silica, sillimanite and zircon. Refractory materials of similar type are also employed in the production of the "stucco" that is normally applied to the coating of slurry before gelation takes place. For instance dry refractory particles can be dropped onto the moist coating to form the "stucco".

The particle size of the refractory filler used in preparing the slurry is preferably less than 200 mesh, that is to say none of the powder is retained on a 200 mesh British Standard Sieve (B.S.S.), and preferably the refractory should contain a significant proportion, perhaps 50 to 75% of material of particle size less than 300 mesh. The slurry can be prepared simply by mixing the powdered refractory filler a little at a time with the binding agent. A slurry of suitable viscosity can for example contain between about 30 and about 90 parts of the binder per 100 parts by weight of the refractory filler, depending mainly on the type and state of subdivision of the filler. After the first coating has been applied to the fusible pattern and gelled further coatings are usually added often to a total of for instance six or more. The slurry has an acid pH, for instance a pH from 1.5 to 5.0, such as about 2 or 3. An organic or inorganic acid can be present as a means of imparting an acid pH to the slurry, such as acetic, nitric, or hydrochloric acid. The coating of slurry is gelled by exposing to the ammonia atmosphere, the time of exposure being between 10 seconds and 5 minutes. It can, for instance, be exposed between 30 seconds and 2 minutes, for example, a time period such as about one minute. The shorter times in the range may be preferable where the process is to form part of a continuous operation.

The gelation reaction needs to be substantially complete (that is, the gelled coating should not be affected by application of the succeeding coating) at the end of the desired exposure period, and the concentration of ammonia in the atmosphere is accordingly sufficient to ensure this. However, the concentration should not be too great, for a surprising feature of the invention is the discovery that the flexural strength of the completed shell mould is improved if the rate at which gelation takes place is kept fairly slow and this rate is dependent mainly on the ammonia concentration. It is not possible to predict a precise relationship between the ammonia concentration and the gelation time because of the influence of such factors as binder composition, coating thickness, the shape of the pattern and the geometry of the ammonia chamber, but these are normally constant factors and in any particular case a few experiments are all that is required to determine the conditions leading to a rate of gelation giving optimum shell strength. With regard to the composition of the binder, it can be said that a binder of relatively high $SiO_2$ content and pH normally requires a relatively low concentration of ammonia to achieve a similar gelation rate. In general the ammonia concentration should be chosen so that the gelation reaction is not substantially complete in less than 10 seconds; preferably completion takes at least 30 seconds, for instance between 30 seconds and 2 minutes. Although shell moulds of good strength are normally obtained where the gelation reaction takes from 10 seconds to 5 minutes, gelation times of more than 2 minutes are often inconveniently long and a reaction time between 30 seconds and 2 minutes, such as about 1 minute, is usually satisfactory. Preferably gelation is substantially complete immediately before the end of the exposure period.

In most cases, the concentration of ammonia in the atmosphere is preferably between 0.1% and 5% by volume for instance between 0.2% and 2% or 3%, such as about 0.5% by volume. A coating of a slurry in which the binding agent contains about 20% of silica can for example be gelled in 20 seconds in an atmosphere containing 2% by volume of ammonia.

After the coating has been gelled it is removed from the ammonia atmosphere, and a further coating is added in the same way. After a number of coats have been built up the fusible pattern can be melted out; for example a wax pattern can be removed by treatment with steam under pressure as described in United States co-pending application Ser. No. 208,912, now Patent No. 3,148,422.

The process of the invention is illustrated by the following examples.

EXAMPLE 1

The example describes the production of a shell mould suitable for casting an impeller for a pump.

A hydrolysed solution of ethyl silicate was prepared as follows:

Six hundred cc. of Silester OS (a commercial ethyl silicate containing the equivalent of 40 to 42% by weight of silica) were poured slowly with stirring into a mixture of 360 cc. of industrial methylated spirits (containing 6% by weight of water), 40 cc. of water and 1.0 cc. of concentrated hydrochloric acid. The quantity of water present was about 10% by weight of the ethyl silicate. Stirring was continued for a further 20 minutes and the solution was then allowed to stand for 16 hours. This was the binding agent.

Two thousand cc. of sillimanite of particle size less than 200 B.S.S. mesh were added gradually with continuous stirring to the hydrolysed solution of ethyl silicate, giving a final slurry suitable for coating a pattern.

A wax pattern of an impeller provided with a length of stout wire to act as a handle was then dipped into the slurry, rotated slowly to ensure a uniform coating and the absence of entrapped air bubbles, and then removed and allowed to drain for 30 seconds. One end of the pattern was left uncoated. A stucco of a coarse grade of sillimanite (all was retained on an 80 mesh B.S.S. sieve) was then applied to the wet surface as uniformly as possible. The coated pattern was then transferred to a chamber, which was sealed. Gaseous ammonia was injected into the chamber to give an atmosphere containing 0.5% by volume of ammonia. After 1 minute the atmosphere was pumped out, and the coated pattern was removed.

After this treatment gelation of the coating had occurred, and a second coating of slurry was then applied. The process was repeated applying alternatively stucco and slurry until a total of several layers had been built up. After exposure of the final layer to ammonia, the coated pattern was dried in a stream of warm air until excess alcohol and water had been removed.

The coated pattern was then dewaxed in an autoclave using steam (under pressure) to give a shell mould suitable for use in casting a metal impeller.

When the concentration of ammonia gas employed in the chamber was 0.1% by volume the gelation time was 4 minutes.

EXAMPLE 2

This example describes the production of a refractory shell mould by a process in which a silica sol is used as the binding agent.

A slurry was prepared from 160 grams of sillimanite having a particle size less than 200 B.S.S. mesh and 100 grams of Syton 2X (a stable silica sol containing 30% by weight of silica colloidally dispersed in water) to which had been added sufficient concentrated hydrochloric acid to give an approximately 0.1 N solution (about 1.5 cc.). There was also present a small quantity of a surface-active agent.

This slurry was used to apply a coating to a wax pattern as described in Example 1. The coated pattern was then transferred to the chamber and subjected to an atmosphere containing 3% by volume of ammonia for 25 seconds. At the end of this period the coating had hardened, and subsequent coatings of slurry could be applied.

EXAMPLE 3

The following experiments demonstrate the criticality of the ammonia concentration and its effect on the flexural strength of the resultant shell mould.

(A) The procedures described in Example 1 were repeated exactly with the exception that the concentration of ammonia used in the setting step was 0.6% by volume and the wax pattern used was in the form of a rectangular slab 6 inches long, 1/8 inch thick and 1 inch wide. At the end of the first application and setting period the coating had hardened, and a second coating of slurry was then applied. The process was repeated applying alternately stucco and slurry until a total of 6 layers had been built up. After exposure of the final layer to ammonia, the coated pattern was dried in a stream of warm air until excess alcohol and water had been removed, such stream of air being at a temperature such that the temperature of the coated pattern did not exceed 20° C.

The coated pattern at a room temperature of 20° C. was suspended with the open end downwards over a tray in an autoclave at room temperature and subjected to the action of steam at a pressure of 80 pounds per square inch gauge and a temperature of 162° C. After three minutes it was found that almost all of the wax had run out of the coating into the tray and was suitable for reuse. The refractory coating was removed from the autoclave and placed in a furnace at 900° C. for 30 minutes.

The resulting shell mould was then cut open longitudinally so as to yield two flat pieces 4½ inches by 1 inch by 3/16 inch thick and the flexural strength of these was measured by measuring the load necessary to break them when applied to the mid-point of a 3 inch span. The average result for the two pieces was 1022 pounds per square inch.

(B) The following experiment is a repetition of the method of investment described in the example of U.S. Patent No. 3,148,422, but the wax pattern used was in the form of a rectangular slab 6 inches long, 1/8 inch thick and 1 inch wide, this shape being chosen so as to facilitate testing of the ceramic shell mould as described below.

A partially hydrolysed solution of ethyl silicate was prepared as follows:

Six hundred cc. of "Silester" OS (a commercial ethyl silicate containing the equivalent of 40 to 42% by weight of silica) were poured slowly with stirring into a mixture of 360 cc. of industrial methylated spirits (containing 6% by weight of water), 40 cc. of water and 1.0 cc. of concentrated hydrochloric acid (specific gravity 1.16). The quantity of water present was about 10% by weight of the ethyl silicate. Stirring was continued for a further 20 minutes and the solution was then allowed to stand for 16 hours.

Two thousand cc. of sillimanite of particle size less than 200 B.S.S. mesh were added gradually with continuous stirring to the hydrolysed solution of ethyl silicate, giving a final slurry having a viscosity of 250 centipoises measured at a shear rate of 50.67 seconds$^{-1}$.

The wax pattern provided with a length of stout wire to act as a handle was then dipped into the slurry, rotated slowly to ensure a uniform coating and the absence of entrapped air bubbles, and then removed and allowed to drain for 30 seconds. One end of the pattern was left uncoated. A stucco of powdered sillimanite of particle size such that none was retained on a 40 mesh B.S.S. sieve but all was retained on an 80 mesh B.S.S. sieve was then applied to the wet surface as uniformly as possible, its function being partly to provide a key for the second coating of slurry to be applied later. The coated pattern was then transferred to a chamber provided with an open reservoir of concentrated aqueous ammonia (specific gravity 0.880) and rotated slowly in the ammonia-enriched atmosphere for 30 seconds. (This atmosphere was analysed to contain approximately 99–100% $NH_3$.)

At the end of this period the coating had hardened, and a second coating of slurry was then applied. The process was repeated applying alternately stucco and slurry until a total of 6 layers had been built up. After exposure of the final layer to ammonia, the coated pattern was dried in a stream of warm air until excess alcohol and water had been removed, such stream of air being at a temperature such that the temperature of the coated pattern did not exceed 20° C.

The coated pattern at a room temperature of 20° C. was suspended with the open end downwards over a tray in an autoclave at room temperature and subjected to the action of steam at a pressure of 80 pounds per square inch gauge and a temperature of 162° C. After three minutes it was found that almost all of the wax had run out of the coating into the tray and was suitable for reuse. The refractory coating was removed from the autoclave and placed in a furnace at about 900° C. for 30 minutes.

The resulting shell mould was then cut open longitudinally so as to yield two flat pieces 4½ inches by 1 inch by 3/16 inch thick and the flexural strength of these was measured by measuring the load necessary to break them when applied to the mid-point of a 3-inch span. The average result for the two pieces was 796 pounds per square inch.

In view of the foregoing experiments (A) and (B), it can readily be seen that the concentration of ammonia has a substantial effect on the flexural strength of the resultant shell mould. Specifically Payne's (U.S. 3,148,422) shell mould had a flexural strength of 796 p.s.i.g. as contrasted to the present invention Example 3 (A) shell mould strength of 1022 p.s.i.g. In other words, the present invention process yielded a 28.4% increase in flexural strength over the strength of the mould produced by the Payne process in which an atmosphere containing a much higher concentration of ammonia is used.

The above described experiments (A) and (B) of Example 3 were repeated in the exact same manner with the exception that molochite was used as the refractory material instead of sillimanite. The results of the flexural strength tests showed that the present invention process yielded a shell mould having a strength of 450 p.s.i.g. as contrasted to a shell mould, subjected to Payne's process, which had a strength of 251 p.s.i.g. Thus in this instance an increase of 79.5% in flexural strength was achieved by using the process of the present invention when compared to using the process of Payne. As previously mentioned, the surprising and unique discovery of the present invention is the selective use of a combination of a low ammonia concentration and a specific setting time, e.g., 30 seconds to about 2 minutes. Thus, it is readily apparent from the experimental data presented herein, that using the present invention process results in an increase of flexural strength of from about 30% to about 80% based upon the strength of a shell mould produced by the Payne process. The present invention, then, is a significant improvement over the process described in the Payne Patent, U.S. 3,148,422.

In a preferred embodiment of the present invention there is provided a process for the production of a refractory shell mould characterized by having a high flexural strength. This comprises applying to a fusible pattern a coating of an aqueous slurry having a pH in the range of from about 1.5 to about 5.0 and containing (a) particles of finely divided sillimanite having a particle size less than 200 mesh, and (b) a hydrolysed solution of ethyl silicate; the solution of ethyl silicate has a silica content in the range of from about 10% to about 30% by weight $SiO_2$. A layer of sillimanite particles, having particle size such that substantially all the particles are retained on an 80 mesh screen is then uniformly applied to the coated pattern which is subsequently contacted with ammonia-containing air for a period of time of from about 10 seconds to about one minutes. The ammonia content of the air, which is from about 0.05% to about 1.0% by volume, is sufficient to gel the coatings positioned on the fusible patterns within such time period. It is preferred that the aforementioned steps be repeated to form a total of about six layers (or more) on said fusible pattern. Such layers are in an essentially laminated form. The laminated, coated, fusible pattern is then dried in a stream of warm air until the excess alcohol and water in the pattern present as a result of the use of the aforesaid hydrolysed solution of ethyl silicate, have been removed, such stream of air being at a temperature such that the temperature of the coated fusible pattern does not exceed 20° C. Afterwards the dried, fusible, coated pattern is treated in an autoclave with steam at a pressure of from about 20 to about 100 pounds per square inch gauge and at a temperature of from about 100° C. to about 200° C. for a period of time of from about three minutes to about 10 minutes whereby the action of said stream causes the fusible pattern material to be separated from the laminated (gelled) coatings thereby producing a shell mould. As a final preferred step, the shell mould is placed in a furnace, which is maintained at a temperature from about 500° C. to about 1200° C. for a period of from about ten minutes to about 60 minutes whereby said shell mould is further dried and hardened. The shell mould produced by the above process is further characterized by having a flexural strength, as determined pursuant to the test hereinbefore set forth in the specification, of at least 1000 lbs. per square inch gauge, preferably from about 1000 p.s.i.g. to about 1200 p.s.i.g.

What is claimed is:

1. A process for the production of a refractory shell mould in which there is applied to a fusible pattern a coating of an aqueous slurry having an acid pH value and containing a finely-divided refractory filler and a silica-containing binding agent, the binding agent having a silica content expressed as $SiO_2$ of between 7 and 50% by weight, the coated pattern is placed in a chamber, gaseous ammonia and air are injected into the chamber to provide an atmosphere containing from 0.05% to 5% by volume of ammonia sufficient to gel the coating in a time between 10 seconds and 2 minutes, the coated pattern is retained in this atmosphere for a time between 10 seconds and 2 minutes sufficient to gel the coating, the ammonia atmosphere is exhausted from the chamber, a plurality of coatings are built-up on said pattern by repeating the above steps to form a shell mould structure and the shell mould is separated from the fusible pattern.

2. In a process for the production of a refractory shell mould in which there is applied to a fusible pattern a coating of an aqueous slurry having acid pH values and containing a finely-divided refractory filler and a silica containing binding agent containing from about 7 to about 50% by weight of silica and the coating is gelled and the process is repeated until the pattern contains several coatings and until a laminated shell mould structure is formed, the steps of controllably and uniformly gelling said coating which comprise (1) placing said coated pattern containing a coating in an ungelled state in a chamber, (2) introducing gaseous ammonia into said chamber in an amount sufficient to provide an atmosphere containing from about 0.05% to about 5% by volume of said gaseous ammonia, (3) contacting said coated pattern with said atmosphere of ammonia in said chamber for a period of from about 10 seconds to about 5 minutes thereby uniformly gelling said coating, and (4) removing said atmosphere of ammonia and said coated pattern containing the gelled coating from said chamber.

3. A process as in claim 2, in which the binding agent contains between about 7% and 35% by weight of silica.

4. A process as in claim 2, in which the binding agent is a solution of hydrolyzed ethyl silicate and contains between 10% and 30% by weight of silica.

5. A process as in claim 2, in which the binding agent is a silica sol which contains from about 20% to 40% by weight of silica.

6. In a process for the production of a refractory shell mould in which there is applied to a fusible pattern a coating of an aqueous slurry having a pH in the range of from about 1.5 to 5.0 and containing particles of a finely divided refractory filler having a particle size less than 200 mesh and a silica containing binding agent having a silica content in the range of from about 7% to about 50% by weight of silica and the coating is gelled and the process is repeated until the pattern contains a plurality of coatings, the steps of controllably and uniformly gelling said coating which comprise (1) placing said coated pattern containing said coating in an ungelled state in a chamber, (2) introducing gaseous ammonia and air into said chamber in an amount sufficient to provide an atmosphere containing from about 0.1 to about 5% by volume of said gaseous ammonia, (3) contacting said coated pattern with said atmosphere of ammonia in said chamber for a period of from about 30 seconds to about 2 minutes thereby uniformly gelling said coating and (4) removing said atmosphere of ammonia and said coated pattern containing the gelled coating from said chamber.

7. A process as in claim 6, in which the binding agent is a solution of hydrolyzed ethyl silicate and contains between 10% and 30% by weight of silica.

8. A process as in claim 6, in which the binding agent is a silica sol which contains from about 20% to 40% by weight of silica.

9. A process for the production of a refractory shell mould characterized by having a high flexural strength, which process comprises (1) applying to a fusible pattern a coating of an aqueous slurry having a pH in the range of from about 1.5 to about 5.0 and containing (a) particles of finely divided sillimanite having a particle size less than 200 mesh, and (b) a hydrolyzed solution of ethyl silicate, said solution of ethyl silicate having a silica content in the range of from about 10% to about 30% by weight $SiO_2$; (2) uniformly applying a layer of sillimanite particles having particle size such that substantially all the particles are retained on an 80 mesh screen to such coated pattern; (3) contacting the coated fusible pattern with ammonia-containing air having an ammonia content of from about 0.05 to about 1% by volume for a period of time of from about 10 seconds to about one minute sufficient to gel said coating on the fusible pattern within said time; (4) repeating steps 1, 2 and 3 to form a total of about six coatings on said fusible pattern; (5) drying said coated fusible pattern in a stream of warm air until the excess alcohol and water present in said coating have been removed, such stream of air being at a temperature such that the temperature of the coated fusible pattern does not exceed 20° C.; (6) contacting the dried, fusible, coated pattern in an autoclave with steam at a pressure of from about 20 to about 100 pounds per square inch gauge and at a temperature of from about 100° C. to about 200° C. for a period of time of from about three minutes to about 10 minutes whereby the action of said steam causes the fusible pattern material to be separated from the laminated gelled coatings and there is produced a shell mould; and (7) placing said shell mould in a furnace which is maintained at a temperature from about 500° C. to about 1200° C. for a period of from about ten minutes to about 60 minutes whereby said shell mould is further dried and hardened; said shell mould being further characterized by having a flexural strength, as determined pursuant to the test set forth in the specification, of at least 1000 lbs. per square inch gauge.

References Cited

UNITED STATES PATENTS

| | | | |
|---|---|---|---|
| 2,829,060 | 4/1958 | Emblem et al. | 164—16 X |
| 2,948,032 | 8/1960 | Reuter | 164—26 |
| 3,172,176 | 3/1965 | Greenwood | 164—12 |

FOREIGN PATENTS

| | | |
|---|---|---|
| 580,058 | 8/1946 | Great Britain. |
| 654,817 | 6/1951 | Great Britain. |
| 913,770 | 12/1962 | Great Britain. |

J. SPENCER OVERHOLSER, Primary Examiner

E. MAR, Assistant Examiner

U.S. Cl. X.R.

164—26